May 21, 1968 F. S. BOXALL 3,384,711

REPEATER FOR PULSE CODE MODULATED SIGNALS

Filed Feb. 16, 1967 2 Sheets-Sheet 1

INVENTOR.
FRANK S. BOXALL

BY Flehr, Hohbach, Test, Albritton & Herbert

ATTORNEYS

INVENTOR.
FRANK S. BOXALL
BY Fleit, Hohbach, Test, Albritton & Herbert
ATTORNEYS United States Patent Office 3,384,711
Patented May 21, 1968

3,384,711
REPEATER FOR PULSE CODE MODULATED SIGNALS

Frank S. Boxall, Menlo Park, Calif., assignor to Vicom Corporation, Mountain View, Calif., a corporation of California Filed Feb. 16, 1967, Ser. No. 616,660
4 Claims. (Cl. 178—70)

ABSTRACT OF THE DISCLOSURE

An improved repeater for pulse code modulated signals where an decision circuit receives a voltage threshold signal and a timing signal in coincidence to trigger a blocking oscillator regenator. A transistor is biased by the timing signal and made conductive by the base input voltage threshold signal to act as a coincidence gate firing the blocking oscillator. The blocking oscillator signal is a regeneration of the input pulse and is terminated by a timing signal of opposite polarity. The opposite polarity timing signals are provided by an inductor which differentiates a squarewave.

Figure 1:
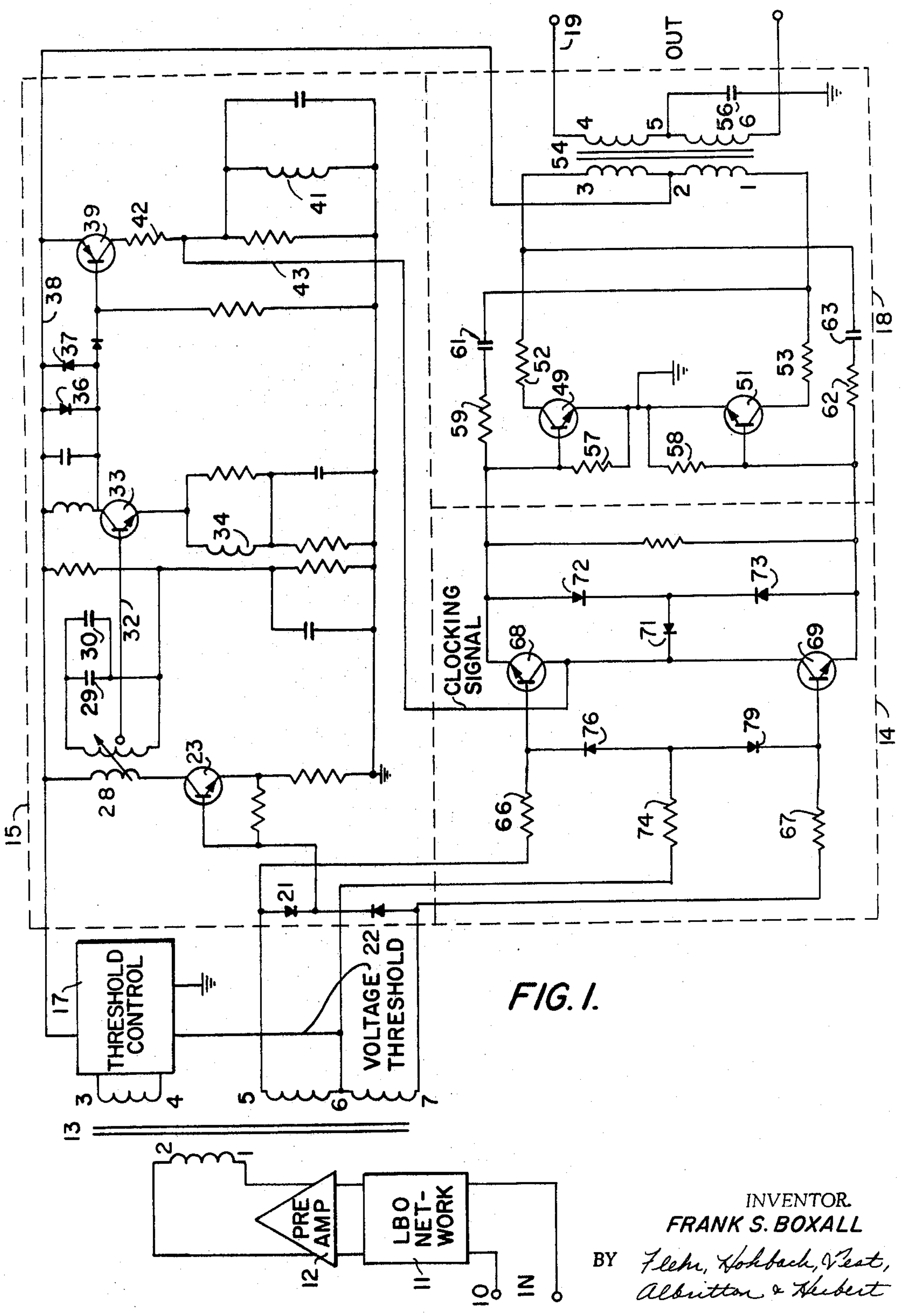

This invention relates generally to a repeater and more specifically to a repeater for use with a pulse code modulated (PCM) signal input.

PCM exchange carrier systems are known. In these systems the message to be transmitted is periodically sampled to provide pulses whose amplitude is proportional to the signal level at the instant of sampling. The pulse amplitude is then encoded to form a seven bit code.

In repeating the bits representing amplitude, it is necessary to "look" at a bit at a optimum time (termed a time crosshair) and, in addition, decide if the amplitude is above or below a threshold value (termed voltage crosshair). The threshold value is normally set at 50 percent of the nominal pulse height to adequately distinguish over the noise level. If the pulse is above the voltage crosshair at the time crosshair, an output regenerator which, for example, may be a blocking oscillator, is triggered to produce an output pulse. Appropriate clocking signals are provided to turn off the regenerator to thus determine the width of the output pulse. If the pulse does not exceed voltage crosshair, the regenerator is not triggered.

It is a general object of the present invention to provide an improved repeater for a pulse code modulated signal.

Additional objects and features of the invention will appear from the following specification in which the preferred embodiment of the invention has been disclosed in conjunction with the accompanying drawings.

The present invention comprises an improved repeater having means for triggering a blocking oscillator which includes a transistor having an output terminal directly coupled to the oscillator being normally non-conductive. The transistor activates the oscillator when it is triggered into its conductive condition. Means for placing the transistor in such conductive conditon are provided and includes means for coupling a clock generator timing pulse output to the collector terminal of the transistor. The timing pulse serves to bias the transistor to respond to a control signal applied to a control terminal. The control terminal is coupled to the voltage output signal of a threshold control means whereby the coincidence of the threshold voltage signal on the control terminal along with the biasing timing pulse on the collector terminal places the transistor in a conductive condition to trigger the blocking oscillator.

Figure 2:
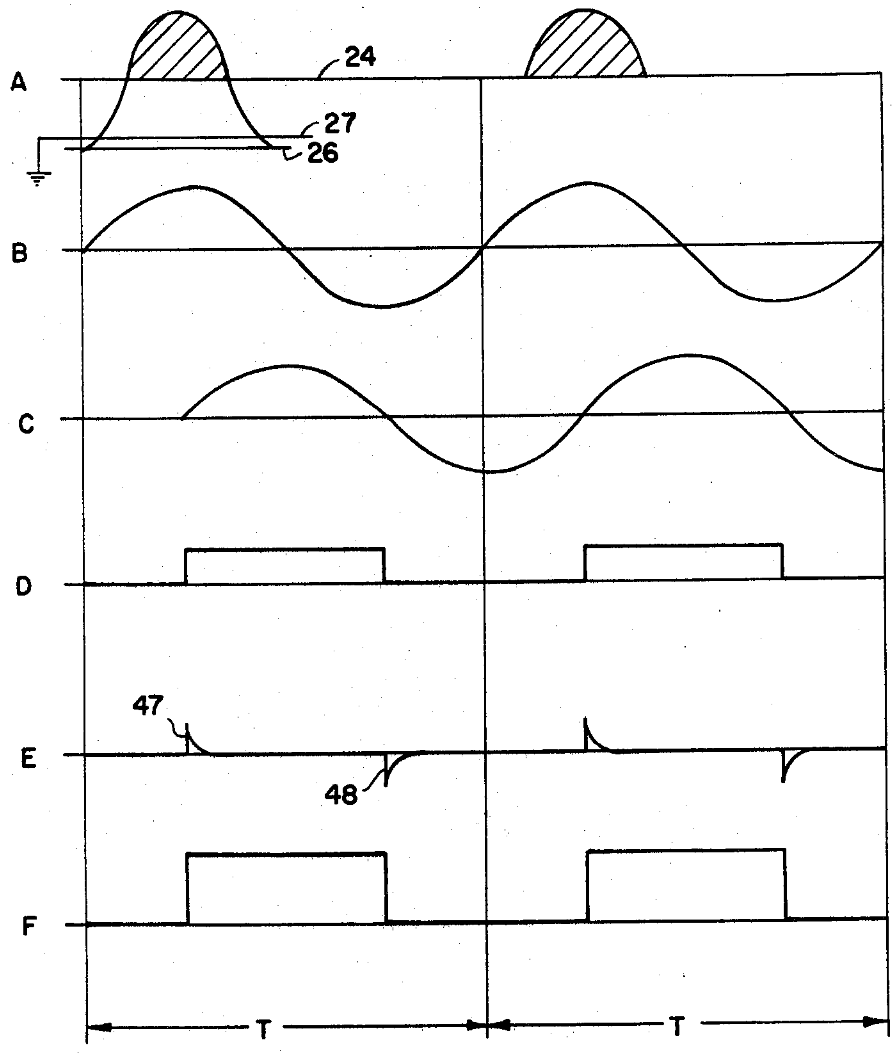

Referring to the drawings:

FIGURE 1 is a circuit schematic, partially in block diagram, of a repeater embodying the present invention; and FIGURE 2(A–F) are waveforms useful in understanding the invention.

Referring to FIGURE 1, the repeater of the present invention generally comprises several major parts. The input terminals 10 are coupled to a previous section of line to receive an input signal in the form of bipolar pulses which may have been attenuated and distorted in the preceding line section.

The input pulses are fed into a line build out (LBO) network 11 which matches the impedance of the repeater with that of the previous line network. A preamplifier 12 couples the LBO network 11 to a transformer 13. The input winding of the transformer is indicated at pins 1, 2. An output winding at pins 5, 6 and 7 provides balanced output signals of opposite polarity. The balanced output winding is coupled to both a decision circuit 14 and a clock generation circuit 15.

A second output winding of transformer 13, pins 3 and 4, is coupled to threshold control device 17 which adjusts the voltage reference level, through a coupling to pin 6 of transformer 13, to 50 percent of the height of the height of the incoming pulses. As will presently be apparent, voltage levels above this reference will cause a pulse to be regenerated in the repeater and voltages below will not. The circuitry of the threshold control device 17 is well known in the art.

Clock generation circuit 15 produces a clocking signal which is coupled to the decision circuit 14. The decision circuit 14 acts as a gate which has an output only when the clocking signal appears concurrently with an input pulse of an amplitude above the threshold level. The output from decision circuit 14 is coupled to the regenerator or oscillator 18 which has an output at terminals 19. The output on terminals 19 is a regenerated pulse with the same polarity as the corresponding input pulse to the repeater.

Referring now more specifically to the clock regeneration circuit 15, the pulse code type pulses appearing between pins 5 and 7 of transformer 13 are coupled to the clock generation circuit through diodes 21 and 22 which are coupled in opposed relation across the pins. The common point between the diodes is the clock drive line which is coupled to the base of transistor 23. Only the top half of the incoming pulse, as shown by the cross-hatched portions in FIGURE 2A, drives the clock generation circuit since the threshold voltage acts to automatically fix the clipping level of the diodes. Thus, the line designated 24 in FIGURE 2A is the 50 percent level which is the firing level of the regenerator circuit 18. This is the voltage crosshair which distinguishes the signal pulses from the noise level.

The base level 26 of the pulse shown in FIGURE 2A is the DC voltage at pin 6 of transformer 13 which is controlled by the voltage threshold control circuit 17. This voltage moves automatically with the incoming pulse amplitude to keep the voltage crosshair 24 at the half amplitude level of the pulse. Circuit ground is indicated at 27 which is, for example, a nominal .3 volt above the base line 26.

Clock drive input to the base of transistor 23 is coupled into a transformer 28 through the collector of the transistor which is a portion of a high Q circuit which "rings" to sustain the timing information over periods when no incoming pulses are present. The resonator is tuned to 1.544 megahertz which, as discussed above, is the system time base.

The resonator includes parallel connected capacitors 29 and 30 connected across the output transformer 28. A center tap output 32 of transformer 28 is coupled to the base input of a transistor 33 which, in conjunction with inductor 34 in the emitter circuit of the transistor, causes a 90° phase shift of the input signal. This is illustrated in FIGURES 2B and 2C. FIGURE 2B is a waveform of the resonator voltage, and FIGURE 2C shows the 90° phase shift. The purpose of the shift is to properly locate a "time crosshair" in the nominal center of the incoming pulse as shown in FIGURE 2A.

The diodes 36 and 37 of the clock circuit are connected in opposed relation in parallel with each other between the collector of transistor 33 and a positive voltage supply 38. These diodes clip the sinewave from transistor 33 and switch a transistor 39, to which they are coupled, to cause collector current of transistor 39 to have a squarewave shape as illustrated in FIGURE 2D. Finally, this collector current is differentiated by an inductor 41 which is series connected through a resistor 42 to the collector circuit to produce a clocking signal on line 43 consisting of positive and negative clock signal pulses 47 and 48, respectively, (FIGURE 2E). These two pulses occur in the time slot, T, which is 648 nanoseconds (corresponding to a frequency of 1.544 megahertz) and the elapsed time between the clock spikes is subtsantially one-half of the time slot. Clocking signal or timing pulse 47 is the "time crosshair" and determines the initiation of the final output pulse on terminal 19 as shown in FIGURE 2F. Clocking or timing pulse 48 terminates this pulse.

Referring now to the regenerator or oscillator circuit 18, the regenerator includes push-pull connected transistors 49 and 51 which provide a balanced output of regenerated pulses to the next section of the transmission line. The emitters of the transistors 49 and 51 are tied together and grounded and their collectors coupled to the input winding of an output transformer 54 through series resistors 52 and 53, respectively. The center tap of this winding is terminated on the positive voltage supply line 38. The output winding of transformer 54 is coupled to the output terminal 19 and its center tap is grounded through a capacitor 56.

Transistors 49 and 51 are connected as blocking oscillators, regenerative feedback being provided by resistors 57 and 58 coupling the emitters of the transistors respectively to the base input terminals. In addition, the collectors of each of the transistors are coupled to the base of the other transistor through series resistor-capacitor circuits 59, 61 in the case of the input to the base of transistor 49 and resistor 62 and capacitor 63 in the case of the input to the base of transistor 51. The triggering input to the bases of transistors 49 and 51, which form the blocking oscillator circuit, is provided by the decision circuit 14.

The input of decision circuit 14 is from pins 5, 6 and 7 of transformer 13, pins 5 and 6 being coupled through resistors 66 and 67 respectively to the base input terminals of transistors 68 and 69. Clocking signal line 43 from the clock generator circuit 15 is connected to the collectors of transistors 68 and 69. This same point is also connected to the base inputs of blocking oscillator transistors 49 and 51 by means of diode 71 which, in turn, is coupled to a common terminal of oppositely connected diodes 72 and 73 which extend between the base inputs of transistors 49 and 51 and the emitter outputs of transistors 68 and 69.

Pin 6 of transformer 13, on which the voltage threshold signal appears, is coupled to the base inputs of transistors 68 and 69 through a series connected resistor 74 and opposed series connected diodes 76 and 77 which have their other terminals coupled respectively to the base inputs of transistors 68 and 69.

It should be emphasized at this point that because of the necessary bipolar output terminals 19, the decision circuitry 14 and the regenerator circuitry 18 provide for transmission and regeneration of input pulses of either polarity. Thus, at any one time, only one-half of each of the circuits 14, 18 is operating.

Operation

When the clocking signal on line 43 is zero, any voltage on pin 5 of transformer 13 cannot turn on regenerator 18 since the collector of transistor 68 is at ground and the effective collector-base diode of the transistor acts as a clamp. When the collector of transistor 68 is driven positive by a timing pulse such as pulse 47 (FIGURE 2E), then the transistor is properly biased and will act as an emitter-follower amplifier; i.e., if its base is made positive, then its emitter follows and produces a triggering signal to blocking oscillator transistor 49. Thus, transistor 68 is normally in a non-conductive condition and when placed in an activated or conductive condition, triggers the blocking oscillator circuit. However, to place the transistor in a conductive condition, two conditions must coincide. First, one of the timing pulses of the proper polarity from the clocking signal line 43 must be present to properly bias the transistor to respond to the control signal applied to its base input and secondly, a voltage of sufficient amplitude must be present on the base input.

More specifically, the base of transistor 68 must be above the voltage crosshair 24 shown in FIGURE 2A; in other words, 2 diode drops above circuit ground 27 as shown in FIGURE 2A. These diode drops are the effective diodes formed by transistor 68 and transistos 49 of the regenerator circuit 18 (or in the case of a negative input pulse, the diodes formed by transistors 69 and 51).

Once the regenerator 18 is fired, it maintains its ON condition even after the clocking signal returns to zero since the emitter-base of transistor 68 is now backbiased by ON transistor 49. More specifically, when transistor 49 is conducting, its base is one diode drop positive above ground. Diodes 71 and 72, which are associated with transistor 68 of the decision circuit 14, are not conducting since a voltage differential equivalent to two diode drops is necessary to make them conduct.

When the clocking signal returns to zero after triggering the regenerator, transistor 68 cannot act as a "reverse transistor" and draw current away from transistor 49 which would tend to turn it off since as a "reverse transistor," transistor 68 has a very poor beta characteristic and the resultant current drain is too small to be of any concern.

If the incoming signal pulse from preamplifier 12 and transformer 13 is negative, the entire regenerative action is identical as discussed above except that transistor 69 serves as a trigger for regenerator blocking oscillator transistor 51. In this case, the output pulse on terminal 19 is negative.

To terminate the output pulse produced by regenerator 18, a negative clocking signal 48 is provided (FIGURE 2E) which drags the regenerator base, for example, transistor 49, negative through diodes 71 and 72. In the case of an input pulse of the opposite polarity, diodes 71 and 73 would be used to draw current from the base circuit of transistor 51. This negative timing pulse is of sufficient negative amplitude to overcome the two diode drops 71, 72 or 71, 73 to turn off the regenerator 18.

Thus, in conclusion, the present invention provides an improved repeater for pulse code modulated signals in which the decision circuit including transistors 68 and 69 are an AND gate which require the coincidence of a time crosshair (a positive clocking signal) and a voltage crosshair (the voltage input pulse as controlled by the threshold voltage) to produce a triggering voltage for the regenerator 18. In addition, the same AND circuit provides for termination of the regenerator output signal when a clocking signal of the opposite polarity is received. The use of transistors in the decision circuit reduces the drive requirements for the regenerator. In the clock pulse generation circuit, the inductor in the output circuit provides for an easy mode of differentiation to provide the necessary clock signals. The resistor feedback of the blocking oscillator transistors 49 and 51 provide for non-criticality in the circuit and for reliable operation.

I claim:

1. A repeater for a pulse code modulated signal having threshold control means for generating a threshold voltage signal when the amplitude of an incoming pulse is above a predetermined value at a predetermined time, a clock generator circuit for providing timing pulses for determining the width of an output pulse and a blocking oscillator responsive to said threshold voltage signal and said timing pulses for producing said output pulse, wherein the improvement comprises means for triggering said oscillator including a normally non-conductive transistor having an output terminal directly coupled to said oscillator and activating said oscillator when said transistor is placed in a conductive condition, means for placing said transistor in a conductive condition including means for coupling said clock generator timing pulse output to the collector terminal of said transistor, one of said timing pulses biasing said transistor to respond to a control signal applied to a control terminal, such means also including means coupling said control terminal to the voltage signal output of said threshold control means whereby coincidence of said threshold voltage signal on said control terminal and a biasing timing pulse on said collector terminal places said transistor in a conductive condition whereby said oscillator is triggered.

2. A repeater as in claim 1 where said clock circuit includes inductance means for producing timing pulses.

3. A repeater as in claim 1 including means coupling said collector terminal of said transistor to said oscillator, said means being responsive to a timing pulse of a polarity opposite that of said biasing timing pulse for terminating the output of said oscillator.

4. A repeater as in claim 1 where said blocking oscillator includes resistive feedback means for producing regenerative action.

References Cited

UNITED STATES PATENTS

| | | | |
|---|---|---|---|
| 2,981,796 | 4/1961 | De Lange | 178—70 |
| 3,069,500 | 12/1962 | King | 178—70 |
| 3,105,194 | 9/1963 | Rappeport | 325—13 |
| 3,110,768 | 11/1963 | Pustelnyk | 178—70 |

OTHER REFERENCES

B. Ostendorf, Bell Lab. Record, "A Completely Electronic Regenerative Telegraph Repeater," pp. 436–441, December 1949.

JOHN KOMINSKI, *Primary Examiner.*